(12) United States Patent
Nwokolo et al.

(10) Patent No.: US 11,157,896 B2
(45) Date of Patent: *Oct. 26, 2021

(54) TRANSACTION DATA TOKENIZATION

(71) Applicant: MASTERCARD INTERNATIONAL INCORPORATED, Purchase, NY (US)

(72) Inventors: Obinna Nwokolo, New York, NY (US); Daniel Goodman, White Plains, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 321 days.

This patent is subject to a terminal disclaimer.

(21) Appl. No.: 16/381,342

(22) Filed: Apr. 11, 2019

(65) Prior Publication Data

US 2019/0236590 A1    Aug. 1, 2019

Related U.S. Application Data

(63) Continuation of application No. 13/835,088, filed on Mar. 15, 2013, now Pat. No. 10,275,764.

(60) Provisional application No. 61/642,872, filed on May 4, 2012.

(51) Int. Cl.
| | | |
|---|---|---|
| *G06Q 40/00* | (2012.01) | |
| *G06Q 20/36* | (2012.01) | |
| *G06Q 20/12* | (2012.01) | |
| *G06Q 20/38* | (2012.01) | |

(52) U.S. Cl.
CPC ............. *G06Q 20/36* (2013.01); *G06Q 20/12* (2013.01); *G06Q 20/363* (2013.01); *G06Q 20/385* (2013.01)

(58) Field of Classification Search
None
See application file for complete search history.

(56) References Cited

U.S. PATENT DOCUMENTS

| | | |
|---|---|---|
| 5,943,423 A | 8/1999 | Muftic |
| 6,636,833 B1 | 10/2003 | Flitcroft et al. |
| 7,155,411 B1 | 12/2006 | Blinn et al. |
| 7,349,871 B2 * | 3/2008 | Labrou .................. G06Q 20/02 705/26.35 |
| 8,095,113 B2 | 1/2012 | Kean et al. |
| 8,812,402 B2 | 8/2014 | Evans et al. |
| 8,887,308 B2 | 11/2014 | Grecia |

(Continued)

*Primary Examiner* — Olabode Akintola
(74) *Attorney, Agent, or Firm* — Budzyn IP Law, LLC

(57) ABSTRACT

A system and method of tokenizing sensitive cardholder payment information for use in cashless transactions includes receiving a request to process a cashless transaction between a merchant and a purchaser using first payment data stored with an electronic wallet provider on behalf of the purchaser. First payment data is retrieved from the electronic wallet provider. The first payment data is tokenized into a payment token, and provided to the merchant for use in completing the cashless transaction using the payment token. The payment token is detokenized into second payment data being indicative of payment token authenticity. Payment for the cashless transaction is processed using the second payment data, and the merchant is provided with a response indicating either the success or failure of the payment processing.

8 Claims, 4 Drawing Sheets

(56) References Cited

U.S. PATENT DOCUMENTS

| | | |
|---|---|---|
| 9,195,984 B1 * | 11/2015 | Spector ................ G06Q 20/322 |
| 2001/0027441 A1 | 10/2001 | Wankmueller |
| 2001/0032192 A1 | 10/2001 | Putta et al. |
| 2001/0034719 A1 | 10/2001 | Durand et al. |
| 2003/0119478 A1 * | 6/2003 | Nagy ................... G06Q 20/341 455/408 |
| 2003/0200184 A1 | 10/2003 | Dominguez et al. |
| 2004/0098350 A1 | 5/2004 | Labrou et al. |
| 2004/0107170 A1 | 6/2004 | Labrou et al. |
| 2004/0177047 A1 | 9/2004 | Graves et al. |
| 2005/0065891 A1 | 3/2005 | Lee et al. |
| 2007/0125838 A1 | 6/2007 | Law et al. |
| 2007/0125840 A1 | 6/2007 | Law et al. |
| 2008/0010191 A1 | 1/2008 | Rackley, III et al. |
| 2008/0010193 A1 | 1/2008 | Rackley, III et al. |
| 2008/0010215 A1 | 1/2008 | Rackley, III et al. |
| 2008/0040265 A1 | 2/2008 | Rackley, III et al. |
| 2008/0126145 A1 | 5/2008 | Rackley, III et al. |
| 2008/0319914 A1 | 12/2008 | Carrott |
| 2009/0076966 A1 | 3/2009 | Bishop et al. |
| 2009/0233579 A1 | 9/2009 | Castell et al. |
| 2009/0292641 A1 | 11/2009 | Weiss |
| 2009/0313147 A1 * | 12/2009 | Balasubramanian .. G06Q 20/12 705/30 |
| 2011/0208656 A1 | 8/2011 | Alba et al. |
| 2012/0036042 A1 | 2/2012 | Graylin et al. |
| 2012/0109826 A1 | 5/2012 | Kobres |
| 2012/0221468 A1 | 8/2012 | Kumnick et al. |
| 2013/0254115 A1 | 9/2013 | Pasa et al. |
| 2014/0025457 A1 | 1/2014 | Martinez et al. |
| 2014/0279106 A1 | 9/2014 | Smelcer |
| 2015/0058227 A1 | 2/2015 | Dua |
| 2015/0178713 A1 | 6/2015 | Van Den Broeck et al. |

\* cited by examiner

TRANSACTION DATA TOKENIZATION

CROSS-REFERENCES TO RELATED APPLICATIONS

This application is a continuation of U.S. patent application Ser. No. 13/835,088, filed Mar. 15, 2013, now U.S. Pat. No. 10,275,674, which claims the priority benefit under 35 U.S.C. § 119(e) of prior U.S. Provisional Patent Application Ser. No. 61/642,872, entitled "TRANSACTION DATA TOKENIZATION", filed 4 May 2012 by the present inventive entity, the entire disclosures of these references being incorporated by reference herein in their respective entireties.

This application is related to non-provisional U.S. Utility patent application Ser. No. 13/209,312 entitled "MULTI-COMMERCE CHANNEL WALLETS FOR AUTHENTICATED TRANSACTIONS", and also International PCT Application Serial No. PCT/US2011/047678 having the same title, both filed 12 Aug. 2011, both of which in turn claim the priority benefit of U.S. Provisional Application Ser. No. 61/372,955 filed 12 Aug. 2010 and also of U.S. Provisional Application Ser. No. 61/468,847 filed 29 Mar. 2011.

This application is further related to U.S. Utility patent application Ser. No. 13/746,904 entitled "SYSTEM TO ENABLE A NETWORK OF WALLETS", filed 22 Jan. 2013, which in turn claims the priority benefit of U.S. Provisional Application Ser. No. 61/588,505, entitled "SYSTEM TO ENABLE A NETWORK OF WALLETS", filed 19 Jan. 2012; of U.S. Provisional Application Ser. No. 61/642,729, entitled "SYSTEM AND METHOD TO ENABLE A NETWORK OF DIGITAL WALLETS", filed on 4 May 2012; of U.S. Provisional Application Ser. No. 61/642,792, entitled "REAL-TIME INTERSTITIAL ELECTRONIC WALLET CREATION", filed on 4 May 2012; and of U.S. Provisional Application Ser. No. 61/642,799, entitled "INTEGRATION OF A PARTNER HOSTED WALLET WITH A NETWORK OF WALLETS", filed on 4 May 2012.

This application is further related to U.S. Provisional Application Ser. No. 61/642,925, entitled "EUREKA CONVERGED", and filed on 4 May 2012.

The complete disclosures of all related applications cited above and any of their corresponding priority applications are hereby incorporated in their entirety for all purposes by this reference.

BACKGROUND

Field of the Disclosure

The present invention relates to transactions for payment of goods/services and, more particularly, to a system and method for tokenization for sensitive or confidential transaction payment data.

Brief Discussion of Related Art

Cashless electronic payment for transaction of goods and services is become ubiquitous in modern society. In connection with this, electronic wallets are becoming a more prevalent counterpart to electronic forms of payment for a wide variety of transactions. Generally speaking, an electronic wallet is a system by which a credit card, debit card, pre-paid card, etc., is stored where a single electronic application which provides access to them, analogous to the way in which one might store corresponding physical payment cards in a tangible wallet.

The disclosure in the application entitled "MULTI-COMMERCE CHANNEL WALLETS FOR AUTHENTICATED TRANSACTIONS", and also the related application entitled "SYSTEM AND METHOD TO ENABLE A NETWORK OF DIGITAL WALLETS", includes a federated network of electronic wallets. The purchaser may select this network of wallets which includes partners who are members of the federation, each of whom provide electronic wallet services. One option presented to the purchaser may be the option to use an electronic wallet maintained and provided by the payment processing entity, e.g., MasterCard International Incorporated (assignee of the instant application), which is also operating the network of wallets.

Given the overwhelming volume of transactions consummated per second, and the necessity that transactions be authorized expeditiously in order to be an acceptable form of payment for all parties involved in the transaction, the circumstances naturally lend themselves to automation of the approval process. However, without adequate oversight on an individual or per-transaction basis, and/or without the parties to the transaction being known to others involved, including the intermediary, the opportunity for malicious abuse of the payment system require adequate safeguards.

A problem presented is where the transaction details required to consummate a purchaser's transaction may be used thereafter for malicious purposes, for example if the security of such data is compromised by a third party, or by another bad actor with access to cardholder data used during the transaction. A solution to this problem is required.

SUMMARY OF THE DISCLOSURE

In order to overcome these and other problems, weaknesses and/or drawbacks in the present state of the art, provided according to the instant disclosure is a system and method for tokenization of sensitive data use in connection with cashless and electronic transactions.

More specifically, a method of tokenizing sensitive cardholder payment information for use in cashless transactions includes receiving a request to process a cashless transaction between a merchant and a purchaser using first payment data stored with an electronic wallet provider on behalf of the purchaser. First payment data is retrieved from the electronic wallet provider. The first payment data is tokenized into a payment token, and provided to the merchant for use in completing the cashless transaction. The merchant issues a request to process payment for the cashless transaction using the payment token.

The payment token is detokenized into second payment data, where correspondence between the first and second payment data is indicative of the authenticity of the payment token received from the merchant. Payment for the cashless transaction is processed using the second payment data, and the merchant is provided with a response indicating either the success or failure of the payment processing.

In a further embodiment of the present disclosure, the payment data is passed to one of a third party tokenizer and a payment service provider, wherein the third party tokenizer or payment service provider tokenizes the payment data into a payment token, provides the payment token to the merchant for use in completing the cashless transaction, receives, from the merchant, the request to process payment for the cashless transaction using the payment token, detokenizes the payment token, processes payment for the cashless transaction using the payment data, and provides the response to the merchant indicating either the success or failure of the payment processing. In this embodiment, the third party tokenizer, or the payment service provider, provides an indication of the success or failure of the payment processing.

In a more particular embodiment of the present disclosure, the payment token further comprises one or more of the following data: a transaction identifier; a name of the cardholder; an address of the cardholder; a postal code related to the address of the cardholder; an indicator that the transaction is related to an electronic wallet; a masked payment card number; a start date related to the payment card; an expiration date related to the payment card; a brand of the payment card; and a type of payment card. Optionally or additionally, the tokenized payment data may include a virtual card number.

In still a further embodiment of the present disclosure, the payment token is bound to the received transaction request, whereby the payment token is valid only under predetermined conditions including one or more of having been submitted by a predetermined merchant, requesting payment of a predetermined dollar amount or range of dollar amounts, and submitted for payment within a predetermined timeframe.

In still a further embodiment of the present disclosure, the method is performed by an operator of a network of wallets, and further the electronic wallet provider is one of the operator of the network of wallets on its own behalf, the operator of the network of wallets on behalf of a third party, and a third party provider of electronic wallet services.

Further provided according to the present disclosure is an electronic system for carrying out the foregoing method including a processor and a non-transitory machine readable recording medium which embodies thereon a program of instruction. The program of instruction, when executed by the processor, cause the machine to carry out the foregoing method in one or more of its embodiments. Also provided according to the present disclosure is such a non-transitory machine readable medium.

BRIEF DESCRIPTION OF THE DRAWINGS

Some embodiments are illustrated by way of example and not limitation in the figures of the accompanying drawings, in which like reference numerals refer to like structures across the several views, and wherein.

DETAILED DESCRIPTION OF THE DISCLOSURE

Figure 1:
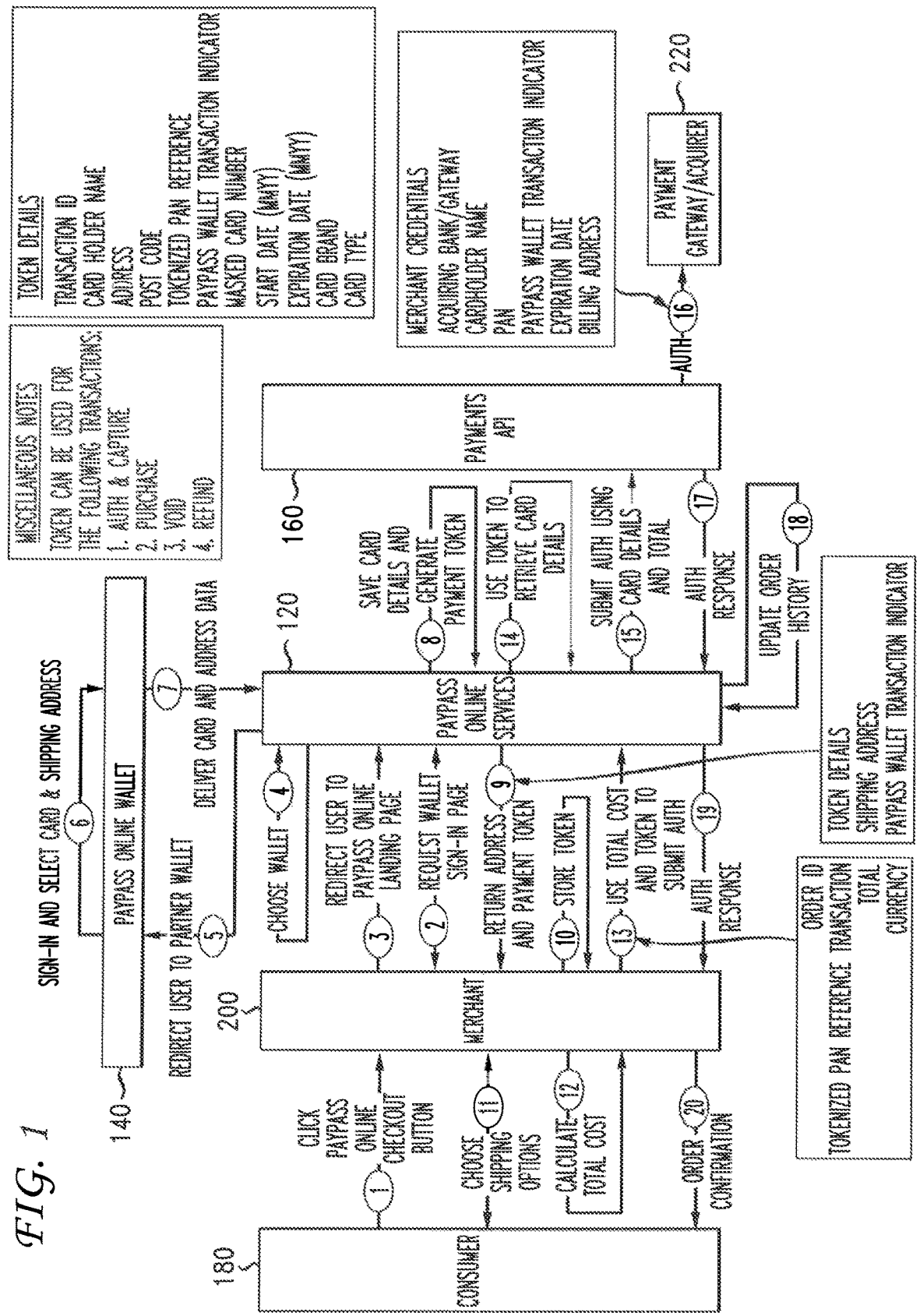
FIG. 1 is a schematic representation of a payment/authentication system and method according to a first embodiment of the present disclosure.

Referring now to FIG. 1, illustrated is a sequence of operations for the tokenization of payment transaction data within the context of a federated network of wallets, for example as described according to related application Ser. Nos. 13/209,312, 61/588,505, and/or 61/642,729. In such a scenario, the operator of the network of wallets is embodied according to reference 120 of FIG. 1, in this case under the name of PayPass Online Services (PPOS). Furthermore, represented as entity 140, PayPass Online Wallet (PPOW), the operator of the network of wallets is further acting as one of the electronic wallet service providers within the federation of network wallets.

Furthermore, in the present embodiment the operator of the network of wallets is also functioning as payment API provider, reference 160. Other parties to the transaction are represented as consumer 180, merchants 200, and payment gateway or acquirer 220. At the point illustrated in the payments process, it is presumed that consumer 180 has selected the group of services to be involved in the transaction with merchant 200. As this process is typically embodied, for example in an online e-commerce transaction, consumer 180 has placed certain goods or services in an electronic shopping cart, and has arrived at a checkout page. The consumer will be presented with options for payment which will include an on-line checkout button invoking the network of wallets operated by PayPass online services 120, which the consumer 180 selects at step 1.

At step 2, the merchant communicates the wallet sign-in request to PPOS 120 and receives a URL to a wallet sign-in page. Merchant 200 then redirects the user to the network of wallets landing page, step 3. The user is given the opportunity to choose an electronic wallet from among those available, including the opportunity to create a new wallet. The wallets may include one operated by PPOW 140 apart from their capacity as the network of wallets operator, alternately wallets operated by PPOW 140 partners with partner-branding or skinning, having the partner's look and feel but operated by wallet provider PPOW 140. Finally, the partner may provide their own wallet services and substitution for PPOW 140. The purchaser chooses their wallet in step 4, and PPOS 120 redirects the user to their selected wallet in step 5.

The consumer signs in to their selected wallet in step 6. They also select from among the payment sources, for example card accounts, associated with their selected wallet. The purchaser further selects a shipping address associated with the wallet. The online wallet provider/PPOW 140 delivers selected card and address data to the operator of the network of wallets, PPOS 120, in step 7.

Network operator 120 then saves the selected card details and uses the card details to generate a payment token which will be shared with the merchant in order to consummate the transaction in step 8. The card details delivered from PPOW 140 would generally include a primary account number (PAN). This sensitive information is better protected, and further the merchant 200 can be enabled to complete the transaction without this specific information. Therefore, the generation of a payment token step 8 would include the payment token as a programming object or file. The token generally includes a transaction identifier; a cardholder name; billing address; postal code; a tokenized PAN reference in substitution for the PAN; a wallet transaction indicator; a masked card number representing the selected card from the wallet; a start date associated with the selected card; an expiration date associated with the card; the card brand and/or type. At step 9, PPOS 120 returns a return address and the payment token together to the merchant 200 in order to finalize the transaction.

In certain embodiments, the tokenized card reference may include a virtual card number (VCN). The virtual card number in substitution for the PAN may provide additional security features. For example, the VCN may be limited to one or a fixed number of uses. A one-time use VCN would being applicable for an isolated transaction. A VCN enabled for repeated use would allowing the merchant 200 to use of the same payment token and/or VCN. On such example where this might be beneficial is with recurring fixed transactions or variable transactions within a predetermined amount range.

Moreover, at the point in the transaction where the token is generated, the full final amount of the transaction may not yet be known. Options such as shipping address or shipping services may affect the final cost through surcharges and/or applicable sales tax. Capping the dollar amount of associated with the payment token consistent with the legitimate completion of the transaction for which it is generated provides an additional layer of security. In addition to capping a dollar amount on the payment token, the payment token may be bound to the merchant involved in initiating the corresponding transaction for which it is generated. That is to say, the particular payment token would not be honored if presented by some other merchant for authentication. In this way, should the payment token be compromised or intercepted by a malicious third party or other bad actor, the payment token would not be useful with any other merchant.

Having received the payment token in step 9, the merchant 200 stores the token as step 10, then presents the consumer 180 with any final options (for example shipping services) to complete the transaction, that being step 11. At step 12, merchant 200 calculates the token total cost in light of the options selected by the consumer 180, and proceeds to step 13 by submitting the total cost of the transaction and the payment token for authentication and payment. The data included at step 13 may include an order ID reference, the tokenized PAN reference provided with the payment token from the network operator 120 at step 9, a total transaction amount, and a currency of the transaction.

PPOS 120 receives the token and authentication request, and uses the token to retrieve the card details to process the payment in step 14. PPOS 120 then submits the authentication using the card details, including PAN, and a total transaction amount in step 15. The payment API 160 provided by the network operator takes the authentication request and passes it to a payment gateway or acquirer 220 and receives back an authentication response in step 16. The authentication request provided by the payment API 160 will generally include merchant credentials; the name of the acquiring bank/payment gateway provider; cardholder name; PAN; wallet transaction indicator; expiration date of the applicable card; and billing address associated with the account upon which the card is drawn.

Payments API 160 then receives and passes an authentication response which in turn is passed to PPOS 120 at step 17. PPOS 120, now with knowledge of the authentication outcome, updates the order history in step 18, and in turn passes the authentication response to the merchant 200 in step 19. Presuming the authentication is affirmative, the merchant 200 confirms the order to the consumer 180, step 20.

Figure 2:
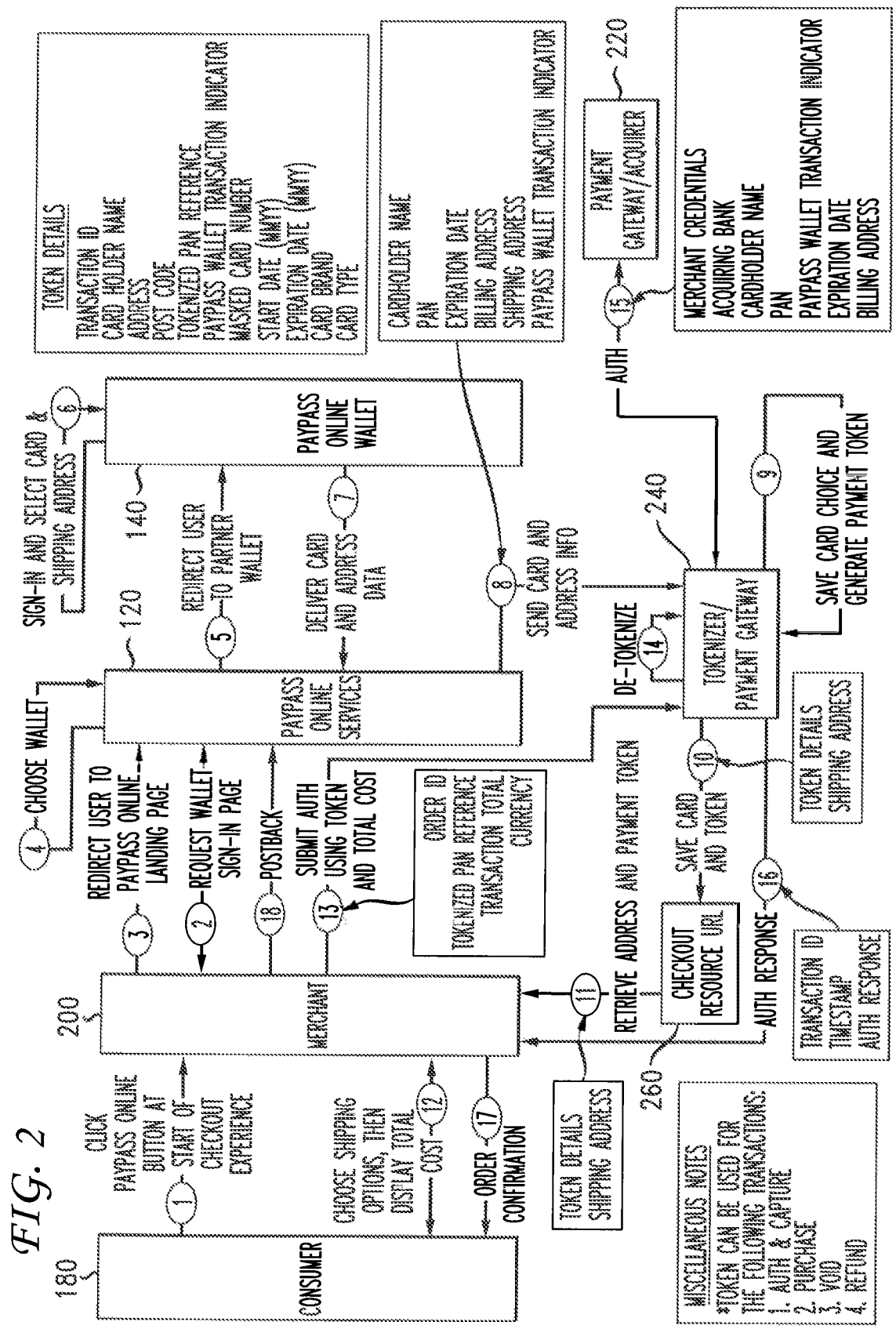
FIG. 2 is a schematic representation of a payment/authentication system and method according to a second embodiment of the present disclosure, including a third-party tokenization entity.

Referring now to FIG. 2, illustrated is an alternative payment transaction. The steps, features, and parties in common with FIG. 1 will not be described in great detail where they do not substantially differ. In the embodiment of FIG. 2 the process and parties proceeds generally in accordance with the above description of FIG. 1, up to step 8. As compared with step 8 of FIG. 1, according to FIG. 2, PPOS 120 effectively outsources the tokenization and gateway authorization. A third party tokenizer and/or payment gateway entity 240 performs these functions.

Tokenizer entity 240 saves the consumer's card choice and generates a payment token associated with the transaction in step 9. At step 10, the tokenizer entity 240 transmits the payment token details and shipping address to the merchant 200, providing a Checkout Resource URL 260. Merchant 200 retrieves the payment token and shipping address from the Checkout Resource URL 260 in step 11. The consumer 180 chooses shipping options, upon which the total cost is computed, at step 12. The merchant 200 then submits the payment token with total transaction cost information in step 13. An order ID, the tokenized PAN reference, a transaction total and currently of transaction may be communicated together. Tokenizer entity 240 detokenizes the authentication request in step 14 and submits the authentication request to the payment gateway/acquirer 220 in step 15. The response to tokenizer entity 240 from the payment gateway/acquirer 220 is transmitted to the merchant 200 in step 16, then on to the consumer 180 with an order confirmation in step 17. A post-back message to PPOS 120 is generated at step 18 to record the outcome of the transaction. In this way, PPOS 120 can log the transaction outcome as part of a value-added service to consumer 180, an acquirer and/or issuer, despite being removed from the authentication process.

Figure 3:
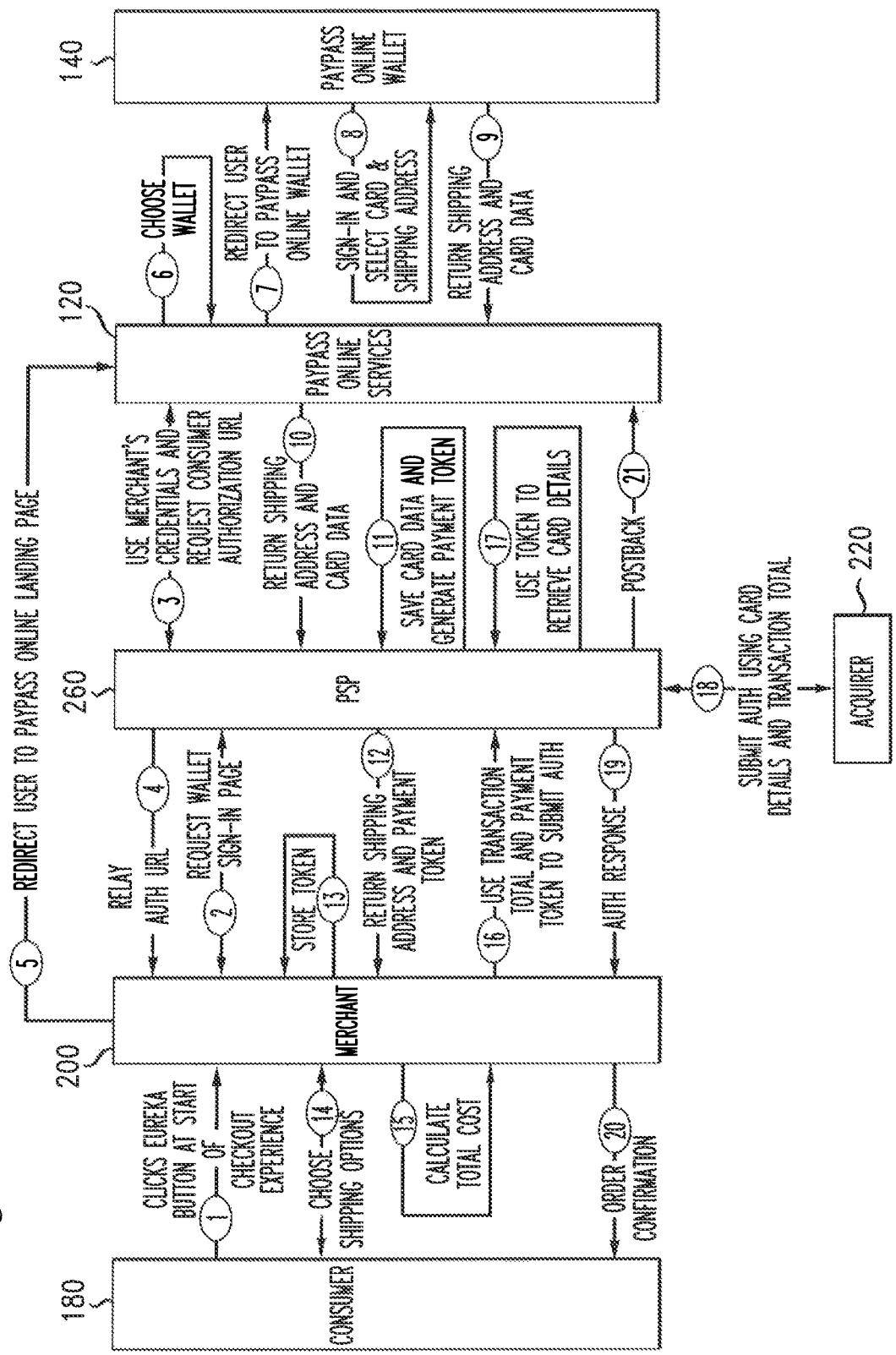
FIG. 3 is a schematic representation of a payment/authentication system and method according to a third embodiment of the present disclosure, including a third-party payment service provider performing tokenization.

FIG. 3 illustrates still another scenario in which the merchant 200 contracts with a third party payment service provider (PSP) 260. The third party PSP 260 stands between the merchant 200 on one side and the PPOS 120 and PPOW 140 on the other. Moreover, the PSP 260 has agree, accepted and/or audited security processes, and is a trusted collaborator for handling confidential transaction information, such as PAN associated with the transactions it processes.

In the embodiment of FIG. 3, PSP 260 stands between POS 120 and merchant 200. PSP 260 performs the tokenization at step 11, and processes the authentication with acquirer 220 in step 18. Additionally, PSP 260 will provide a postback message in step 21 to PPOS 120, confirming the outcome of the transaction.

It will be appreciated by those skilled in the art that the methods as described above may be operated by a machine operator having a suitable interface mechanism, and/or more typically in an automated manner, for example by operation of a network-enabled computer system including a processor executing a system of instructions stored on a machine-readable medium, RAM, hard disk drive, or the like. The instructions will cause the processor to operate in accordance with the present disclosure.

Figure 4:
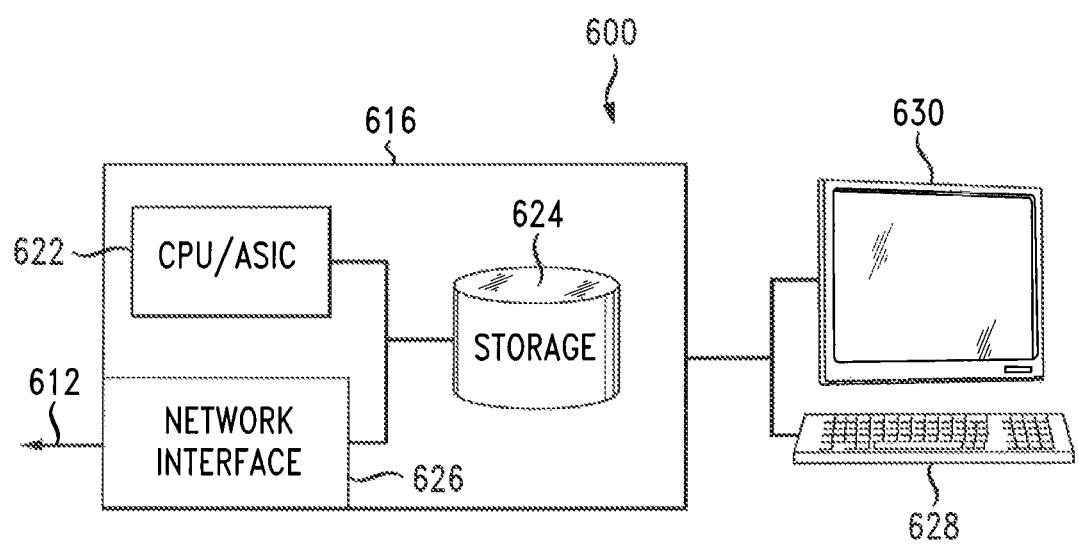
FIG. 4 illustrates schematically a representative computer according to the present disclosure, operative to implement the disclosed methods.

Turning then to FIG. 4, illustrated schematically is a representative computer 616 of the system 600. The computer 616 includes at least a processor or CPU 622 which is operative to act on a program of instructions stored on a computer-readable medium 624. Execution of the program of instruction causes the processor 622 to carry out, for example, the methods described above according to the various embodiments. It may further or alternately be the case that the processor 622 comprises application-specific circuitry including the operative capability to execute the prescribed operations integrated therein. The computer 616 will in many cases includes a network interface 626 for communication with an external network 612. Optionally or additionally, a data entry device 628 (e.g., keyboard, mouse, trackball, pointer, etc.) facilitates human interaction with the server, as does an optional display 630. In other embodiments, the display 630 and data entry device 628 are integrated, for example a touch-screen display having a GUI.

Variants of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method of processing electronic cashless transactions utilizing a network of electronic wallets, the method being carried-out by an operator of the network of electronic wallets in connection with a third-party tokenizer during a cashless transaction and comprising:

receiving, by the operator of the network of electronic wallets, a request from a merchant to process a cashless transaction between the merchant and a purchaser;

forwarding, by the operator of the network of electronic wallets, a URL to the merchant configured to direct the purchaser to a sign-in page for the network of electronic wallets;

with the purchaser having been directed by the URL to the sign-in page and with the purchaser having signed into the network of electronic wallets, receiving, by the operator of the network of electronic wallets, a selection of an electronic wallet by the purchaser from the network of electronic wallets;

in response to the selection of the electronic wallet, directing, by the operator of the network of electronic wallets, the purchaser to the selected electronic wallet;

receiving, by the operator of the network of electronic wallets, first payment data from the selected electronic wallet for a payment source selected by the purchaser from within the selected electronic wallet;

generating, by the third-party tokenizer, a payment token including a virtual card number related to the first payment data;

providing, by the third-party tokenizer, the payment token to the merchant for prompting completion of entry of details related to the cashless transaction;

receiving, by the third-party tokenizer, an authentication request including a total cost of the cashless transaction and the payment token;

detokenizing, by the third-party tokenizer, the payment token received from the merchant to identify the virtual card number;

retrieving, by the third-party tokenizer, the first payment data utilizing the virtual card number;

passing, by the third-party tokenizer, the authentication request, including the first payment data, to a payment gateway or acquirer;

receiving, by the third-party tokenizer, a response to the authentication request from the payment gateway or acquirer; and providing, by the third-party tokenizer, the response to the merchant, the response indicating whether approval of the cashless transaction may be confirmed by the merchant to the purchaser.

2. The method according to claim 1, wherein the payment token further comprises one or more of the following data: a transaction identifier, a name of the holder of the payment source, an address of the holder of the payment source, a postal code related to the address of the holder of the payment source, an indicator that the transaction is related to an electronic wallet, a masked payment card number, a start date related to the payment source, an expiration date related to the payment source, a brand of the payment source, and a type of payment source.

3. The method according to claim 1, wherein the payment token is valid only under predetermined conditions including one or more of having been submitted by a predetermined merchant, requesting payment of a predetermined dollar amount or range of dollar amounts, and having been submitted for payment within a predetermined timeframe.

4. A method of processing electronic cashless transactions utilizing a network of electronic wallets, the method being carried-out by an operator of the network of electronic wallets during a cashless transaction, the method comprising:

receiving a request from a merchant to process a cashless transaction between the merchant and a purchaser;

forwarding a URL to the merchant configured to direct the purchaser to the network of electronic networks to permit the purchaser to select an electronic wallet to provide payment for the cashless transaction;

receiving first payment data from the selected electronic wallet;

generating a payment token including a virtual card number related to the first payment data;

providing the payment token to the merchant for use in completing details related to the cashless transaction;

receiving an authentication request, based on the cashless transaction, from the merchant, the authentication request including the payment token;

detokenizing the payment token to identify the virtual card number;

utilizing the virtual card number, associating the first payment data with the authentication request; and, passing the authentication request to a payment gateway or acquirer for approval.

5. The method according to claim 4, further comprising: passing the first payment data to one of a third-party tokenizer and a payment service provider, wherein the third party tokenizer or payment service provider tokenizes the first payment data into the payment token.

6. The method according to claim 4, wherein the payment token further comprises one or more of the following data: a transaction identifier, a name of the cardholder, an address of the cardholder, a postal code related to the address of the cardholder, an indicator that the transaction is related to an electronic wallet, a masked payment card number, a start date related to the payment card, an expiration date related to the payment card, a brand of the payment card, and a type of payment card.

7. The method according to claim 4, wherein the payment token is bound to the authentication request, whereby the payment token is valid only under predetermined conditions including one or more of having been submitted by a predetermined merchant, requesting payment of a predetermined dollar amount or range of dollar amounts, and submitted for payment within a predetermined timeframe.

8. The method according to claim 4, wherein the electronic wallets are operated by third-party providers.

* * * * *